UNITED STATES PATENT OFFICE.

HEINRICH IMMENDORFF AND HUBERT KAPPEN, OF JENA, GERMANY.

PROCESS OF MANUFACTURING UREA.

1,048,699.  Specification of Letters Patent.  Patented Dec. 31, 1912.

No Drawing.  Application filed July 25, 1911. Serial No. 640,479.

*To all whom it may concern:*

Be it known that we, HEINRICH IMMENDORFF, a citizen of Germany, residing at Kaiser-Wilhelm strasse 7, Jena, in the State of Saxe-Weimar, Germany, professor of chemistry, and HUBERT KAPPEN, a citizen of Germany, and residing at Westendstrasse 15, Jena, in the State of Saxe-Weimar, Germany, chemist, have invented certain new and useful Improvements in Processes of Manufacturing Urea, of which the following is a description.

In the catalytic treatment of cyanamid by means of certain substances in view of the manufacture of urea, it has been found, that the solution in a short time turns alkaline, especially if a high temperature is made use of. Evidently the alkaline reaction is brought about principally by the formation of ammonia owing to decomposition of the cyanamid or the urea. In the alkaline solution of the cyanamid the formation of dicyandiamid is exceedingly accelerated so that a relatively high quantity of dicyandiamid is formed in the process besides the urea. The output of urea is accordingly reduced, and should it be desired to obtain the urea free from dicyandiamid, very circumstantial operations of recrystallization would be necessary, wherein losses of urea are inevitable.

We have found, that the formation of dicyandiamid may be avoided and urea practically free of dicyandiamid obtained, if the process is carried out with an acidic solution. Furthermore by employing an acidic solution, the reaction is performed in a substantially shorter time, a fact, which on the other hand, explains to some extent why the formation of dicyandiamid is avoided in the course of the process, as the longer the reaction, the more dicyandiamid is formed.

Another advantage of carrying out the process with acidic solution according to the present invention, is that the efficiency of the catalytic substance (catalyzer) is not substantially diminished in the course of the operation. In this respect it must be understood that in employing a non-acidic solution certain substances contained in solutions of cyanamid salts or of cyanamid, are precipitated on the catalyzer, owing to the phenomena of adsorption. It is for instance inevitable that cyanamid solutions obtained by the treatment of calciumcyanamid (lime nitrogen) by precipitating the lime with carbonic acid, sulfuric acid or the like, contain a certain amount of calcium salts in solution. The catalyzer absorbs these substances which precipitate upon its surface. This contamination of the catalyzer cannot take place in employing an acidic solution, in which the substances referred to remain in solution.

*Examples:*

I. The operation was carried out, on the one hand in an acidic solution, and on the other hand with a solution of cyanamid showing neutral reaction in the beginning of the operation and becoming alkaline in the course of the operation. Different substances were made use of as catalyzers. 2000 ccm. of the solution, containing 2.4% cyanamid nitrogen, were heated with 300 gr. of the catalytic substances. The acidic solution had been acidified with 10 ccm. of concentrated sulfuric acid.

| Catalyzer. | Time of transformation in acidic solution. | Time of transformation in a solution first neutral, then turned alkaline. |
|---|---|---|
| (1) Peroxid of manganese (natural manganese ore). | 3 hours | 7 hours. |
| (2) Hydroxid of iron | 50 minutes | 2 hours. |
| (3) Hydroxid of chromium. | 2 hours 20 minutes. | 4 hours. |
| (4) Dioxid of tin | 1 hour | 2 hours 15 minutes. |

The acceleration of the reaction in an acidic solution decreased in the trials (2) and (3) owing to the consumption of acid for the formation of salts of the catalyzer in the course of the operation; the solution first acidic became gradually neutral. By replacing the used up acid in the course of the operation, a further acceleration of the reaction may be realized in such cases.

II. 300 gr. of peroxid of manganese artificially prepared were heated to 85–90° with 2000 ccm. of a solution of cyanamid containing 2.4% of cyanamid nitrogen, the solution being thoroughly stirred during the operation; this trial was made once with a solution neutral in the beginning of the operation, and becoming alkaline in the course of the operation, and then with a solution acidified by addition of 10 ccm. of concentrated sulfuric acid. The following results were obtained:

A. *With neutral, afterward alkaline solution.*

| Before operation. | | After operation. | |
|---|---|---|---|
| Percentage of cyanamid-nitrogen in 5 ccm. of the solution. | Percentage of dicyandiamid-nitrogen in 5 ccm. of the solution. | Total percentage of nitrogen (analyzed after Kjeldal) in 10 ccm. of solution. | Dicyandiamid-nitrogen. |
| 104.7 mgr. | 2.28 | 110.00 | 9.28 |

B. *With acidic solution.*

| 109.0 | 3.16 | 111.07 | 3.42 |

In neutral, afterward alkaline solution the operation took two hours, in acidic solution 20 minutes.

It has furthermore been found by us, that the formation of dicyandiamid can be diminished and the output of urea increased to a certain degree,—though less than in using an acidic solution—if care is taken to maintain the initially neutral reaction of the cyanamid solution permanently throughout the process. This effect is obtained by adding gradually during the reaction as much acid as corresponds to the alkalinity formed in the operation.

Example: 2000 ccm. of cyanamid solution with 111 mgr. of cyanamid nitrogen and 3.16 mgr. of dicyandiamid nitrogen in 5 ccm. were heated to 70° with 300 gr. of hydrated manganese peroxid. The neutral reaction was permanently maintained by gradual addition of acid during the operation. After one hour the operation was completed: 5 ccm. of the transformed solution contained 5.10 mgr. of dicyandiamid nitrogen. Hence only about 2 mgr. of dicyandiamid nitrogen had been formed besides the urea, whereas about 7 mgr. of dicyandiamid nitrogen was formed when working in the same conditions with the same solution, but without neutralizing the alkaline reaction.

Peroxid of manganese and its hydrates may be made use of by preference as catalyzers, as these substances are insoluble in diluted acid and as their catalytic action is particularly intense. Other suitable catalyzers are e. g. tin dioxid, iron oxid, hydroxid of iron (especially such iron hydroxid, as has been made difficultly soluble in acids by suitable treatment), oxid and hydroxid of chromium, oxid and peroxid of lead. Of course a mixture of two or more catalyzers could also be employed.

Any suitable acid may be employed for acidifying or neutralizing the solution. The effect of the different acids depends to a certain degree upon their strength or degree of dissociation. Sulfuric acid for instance is more efficacious than acetic acid, nitric acid and hydrochloric acid more than sulfuric acid. Instead of acids acid salts may also be made use of.

Trials have shown that a considerable acceleration of the process can be realized by strongly stirring or shaking the solution together with the catalyzer, or by otherwise suspending or distributing the catalyzer uniformly in the liquid during operation. A similar effect may be obtained by causing the cyanamid solution to drip over the catalyzer filled into suitable apparatus. Furthermore it has been found that it was advantageous, for accelerating the reaction and preventing the formation of dicyandiamid, to heat the solution of cyanamid before adding the catalyzer, and in general to bring the reacting mixture as quickly as possible to the desired temperature.

In using calciumcyanamid (lime nitrogen) obtained according to a well known process by reacting with nitrogen gas upon a heated mixture of carbid and chlorid of calcium, or in using such solutions of cyanamid salts as had been neutralized by means of hydrochloric acid for utilization in the present process, the presence of chlorid of calcium in the solution is embarrassing inasmuch as chlorid of calcium combines with the urea to form hygroscopic compounds which are, as well as the urea, soluble in water and in alcohol. Owing to this fact, the obtaining of pure urea, that is to say urea free from calcium chlorid, by means of recrystallization, is rendered practically impossible in this case. For removing this inconvenience, there are added, to the solution of urea containing chlorid of calcium, such salts (sulfates, carbonates, nitrates or the like) or other substances, as convert the chlorid of calcium into salts insoluble in alcohol. From the mixture of urea and salts so obtained the urea can be extracted free from salts, quantitatively, by means of alcohol.

It has been observed that in carrying out the process in a permanently neutral solution, the efficiency of the catalyzers gradually diminishes. This phenomenon is to be ascribed to the fact, that certain substances contained in the solution, such as for instance carbonate of calcium, sulfate of calcium or the like, are absorbed by the catalyzer, that is to say, precipitated upon its surface. In order to regenerate the catalyzer lessened in its efficiency, it may be treated with acids, water or like agents, whereby the precipitated substances are removed, and the initial efficiency of the catalyzer thus restored.

The process is not only applicable to cyanamid solutions freed of the base, but a solution of cyanamid salts may likewise be used without removal of the base. Should it be desired for instance, to treat cyanamid of calcium or of sodium directly, care must however be taken to add as much acid as necessary for neutralizing the calcium or sodium base, before giving, in case of operating with an acidic solution, the solution the desired acidity. In the same way the small percentage of bicarbonate of calcium, always left in solutions of cyanamid obtained from cyanamid of calcium by precipitating the calcium base with carbonic acid, may be destroyed previously by means of the addition of a corresponding amount of acid.

Cyanamid of calcium (lime nitrogen) which is first to be considered for use as primary material in the present process, is very slightly soluble in water, so that it is hardly possible to obtain with the ordinary method a solution containing more than 3% of cyanamid nitrogen. In order to obtain more concentrated solutions for the present process, it is advisable to proceed as follows: The poor solution obtained in a first treatment of the cyanamid of calcium with water, is freed of the calcium base by precipitating with carbonic acid, sulfuric acid, oxalic acid or the like. The cyanamid solution free from bases thus obtained is then used for extracting further quantities of cyanamid of calcium, and from the more concentrated solution thus obtained the calcium base is again precipitated. This operation is to be repeated until the desired degree of concentration is realized. Instead of utilizing this cyanamid solution freed from bases, the weak solution of urea first obtained in the process, might be made use of for dissolving the cyanamid of calcium and the solutions thus obtained containing a mixture of urea and cyanamid employed again and again in the process, until the desired strength of the urea solution is reached.

The urea produced by the invention described is suitable for the manufacture of other chemical compounds. As it contains none or only a small amount of dicyandiamid (which is a poison for vegetables) it can also be employed for fertilizing purposes.

What we claim is:

1. The process of manufacturing urea, which consists in treating a solution of cyanamid with suitable catalyzers and preventing alkaline reaction in the solution by the addition of acid.

2. The process of manufacturing urea, which consists in treating a solution of cyanamid with suitable catalyzers and preventing alkaline reaction in the solution by the addition of an agent having an acid reaction.

3. The process of manufacturing urea which consists in treating an acidic solution of cyanamid with suitable catalyzers.

4. The process of manufacturing urea, which consists in treating a solution of cyanamid with suitable catalyzers and maintaining a non-alkaline reaction of the solution by the addition of acid.

5. The process of manufacturing urea, which consists in treating an acidic solution of cyanamid with a metallic oxid.

6. The process of manufacturing urea, which consists in treating an acidic solution of cyanamid with a hydrated metallic oxid.

7. The process of manufacturing urea, which consists in treating an acidic solution of cyanamid with manganese peroxid.

8. The process of manufacturing urea, which consists in treating an acidic solution of cyanamid with hydrated manganese peroxid.

9. The process of manufacturing urea, which consists in treating a solution of cyanamid with a metallic oxid and maintaining a non-alkaline reaction of the solution by the addition of acid.

10. The process of manufacturing urea, which consists in treating a solution of cyanamid with a hydrated metallic oxid and maintaining a non-alkaline reaction of the solution by the addition of acid.

11. The process of manufacturing urea, which consists in treating an acidic solution of cyanamid with a suitable catalyzer and bringing the catalyzer into close contact with the solution during treatment.

12. The process of manufacturing urea, which consists in treating an acidic solution of cyanamid with catalyzers and distributing the catalyzer uniformly in the solution.

13. The process of manufacturing urea, which consists in treating an acidic solution of cyanamid with catalyzers and distributing the catalyzer uniformly in the solution by stirring.

14. The process of manufacturing urea, which consists in treating a solution of cyanamid with a suitable catalyzer, maintaining a non-alkaline reaction of the solution by the addition of acid, and bringing the catalyzer into close contact with the solution during treatment.

15. The process of manufacturing urea, which consists in treating a solution of cyanamid with a suitable catalyzer, maintaining a non-alkaline reaction of the solution by the addition of acid, and distributing the catalyzer uniformly in the solution.

16. The process of manufacturing urea, which consists in treating a solution of cyanamid with suitable catalyzers, maintaining a non-alkaline reaction of the solution by the addition of acid, and distributing the catalyzer uniformly in the solution by stirring.

17. The process of manufacturing urea which consists in treating with suitable catalyzers an acidic solution of cyanamid, preheated to the reaction temperature.

18. The process of manufacturing urea, which consists in treating with suitable catalyzers a solution of cyanamid preheated to the reaction temperature, and maintaining a non-alkaline reaction of the solution by the addition of acid.

19. The process of manufacturing urea, which consists in treating a solution of cyanamid, preventing alkaline reaction by the addition of acid, with a catalyzer used in former operations, and regenerated by treatment with suitable solvents.

20. The process of manufacturing urea, which consists in treating a solution of cyanamid, preventing alkaline reaction by the addition of acid, with a catalyzer used in former operations, and regenerated by treatment with suitable acids.

21. The process of manufacturing urea, which consists in neutralizing an aqueous solution of a cyanamid salt, acidifying the solution with as much acid as is necessary for maintaining the acidic reaction permanently during the operation and heating the acidified solution with a suitable catalyzer.

22. The process of manufacturing urea which consists in adding to a solution of a cyanamid salt as much acid as is necessary for neutralizing the base of the salt and for destroying soluble bicarbonates contained in the solution, heating the solution with a suitable catalyzer and adding during the operation as much acid as is necessary for maintaining a non-alkaline reaction of the solution.

23. The process of manufacturing urea, which consists in treating a solution of cyanamid of calcium containing chlorid of calcium with a catalyzer, preventing alkaline reaction by the addition of acid, adding to the thus obtained solution substances suitable for forming with the chlorid of calcium salts insoluble in alcohol, and extracting the urea from the mixture of salts and urea by means of alcohol.

24. The process of manufacturing urea, which consists in preparing an aqueous solution of cyanamid of calcium, removing therein the base by precipitating it by suitable agents and filtering the precipitate, employing the thus obtained cyanamid solution as solvent for a fresh quantity of cyanamid, removing again from the thus obtained solution the base, and treating the concentrated solution of cyanamid finally obtained with a catalyzer, while at the same time preventing alkaline reaction.

25. The process of manufacturing urea, which consists in dissolving cyanamid of calcium in a solution of urea, removing from the thus obtained solution the base by precipitating it with suitable agents and filtering the precipitate, and treating the thus obtained solution with a catalyzer, while preventing alkaline reaction.

In testimony whereof we affix our signatures in presence of two witnesses.

HEINRICH IMMENDORFF.
HUBERT KAPPEN.

Witnesses:
 RUDOLPH FRICKE,
 ALBERT R. MORAWETZ.